UNITED STATES PATENT OFFICE.

CHARLES L. KALMBACH, OF RICHMOND, VIRGINIA.

IMPROVEMENT IN EXPLOSIVE COMPOUNDS OR DYNAMITES.

Specification forming part of Letters Patent No. 153,086, dated July 14, 1874; application filed June 24, 1874.

*To all whom it may concern:*

Be it known that I, CHARLES L. KALMBACH, M. E., of Richmond, in the county of Henrico and State of Virginia, have invented a new and useful Improvement in Explosive Compounds; and I do hereby declare that the following is a full, clear, and exact description of the mode of preparing the same.

A long familiarity with nitro-glycerine and its uses has convinced me that it is safest to manufacture it at the place where it is to be used, particularly as such manufacture requires but very simple and inexpensive apparatus and involves no risk whatever from premature explosion. When manufactured and thoroughly cleansed from free acid it may be kept for years with perfect safety, if due regard be had for its natural peculiarities. The first necessity is to avoid anything like a confinement that would make any amount of compression possible. For that reason I have stored it for years in well-glazed earthenware vessels, called crocks in the trade, without any cover except, perhaps, a little water. There is but one way to explode nitro-glycerine in such a vessel, (uncovered,) and that is to slowly raise the temperature of the whole to 360° Fahrenheit. Many hundred experiments and close observations while applying it in an extended practice have satisfied me that the theory so long universally accepted, that nitro-glycerine explodes by concussion, is an error and to blame for many lamentable accidents. I find, also, that compression, especially compression brought about or accompanied by concussion, will inevitably cause an explosion. Therefore, nitro-glycerine should never be kept or carried in thin metallic cans—tin, for instance. If kept in frangible vessels the mouths or openings should be nearly as large as the largest part of the inside unless such vessels are never quite half filled. It should not be allowed to freeze, since it is then particularly liable to explosive compression. I am aware that it is claimed to be safer to keep and ship in a frozen state in tin cans, and that to this day it is so shipped, but I also know that several hundred lives have been lost in consequence of this very precaution. I stand ready to explode every can of frozen nitro-glycerine without primer or fuse, or even without going near it at all. On the other hand, a strong fulminate primer may be exploded in a stone jug or glass carboy of liquid nitro-glycerine without causing an explosion, if such jug or carboy is not quite half full, though the primer be strong enough to break the vessel to pieces—because the air in the upper half of such vessel forms an elastic cushion which prevents the fatal compression.

To obviate some of the dangers attending the use of nitro-glycerine, dynamite and dualin were invented. The first of these is made by saturating silicious infusorial sand with nitro-glycerine, and in the latter some vegetable fiber, such as sawdust or paper-stock, is substituted for the sand of the former. Of course the sand adds nothing and the vegetable very little to the strength, though they do add largely to the safety, because of their porosity, or the large proportion of air they hold in their interstices. Necessarily their value depends solely on the amount of nitro-glycerine they have absorbed—at most twenty-five per cent of their weight.

I have invented a substance which I call fulgurite, which, while occupying much less space than dynamite or dualin, is a far stronger explosive than either of them. It consists of nitro-glycerine mixed with some coarsely-ground farinaceous substance—corn-meal, by preference—in varying proportions. Perhaps the most serviceable proportion is four parts corn-meal to six of nitro-glycerine, but I find it convenient sometimes to use but one part corn-meal to nine of nitro-glycerine, when I want it thin enough to pour. This compound (in all proportions) makes a batter or dough which can be put into horizontal or upward holes without cartridge. It can also be put into broken or seamy holes, as it does not run, and only needs the cartridge under water. Being nearly pure starch, it yields a large volume of gas when the heat of the explosion reduces it, and thus sensibly assists the nitro-glycerine. It is very porous, hence elastic, and consequently safer than pure nitro-glycerine. It freezes at 45° Fahrenheit, and when frozen is practically inexplosive—must be thawed before using. Other farinaceous and even saccharine substances may be used for the same purpose, but none of them that I have tried are as safe, while corn-meal yields to none of them in practical effectiveness, and I therefore designate corn-meal as the very best material for use in working my invention.

What I claim as my invention, and desire to secure by Letters Patent, is—

1. The mode of packing nitro-glycerine at ordinary temperatures and in a fluid state, for shipment, in non-metallic vessels, closed, if need be, but holding, with the nitro-glycerine, at least an equal amount in bulk of atmospheric air; and of stowing the same, when not in transit, in perpendicular or flaring-sided open vessels of similar material and covering, only with a film of water.

2. A new explosive compound, made by mixing nitro-glycerine with corn-meal or equivalent substance, substantially as set forth.

CHARLES L. KALMBACH.

Witnesses:
ASA ROGERS,
J. H. HENRY.